United States Patent [19]

Jacino et al.

[11] Patent Number: 5,401,152
[45] Date of Patent: Mar. 28, 1995

[54] PLASTIC AUTOMOBILE BULB HOUSING REPAIR KIT

[76] Inventors: Gerald Jacino, 85-19 118 St., Kew Gardens, N.Y. 11415; Anthony Jacino, 17 Normandie La., East Moriches, N.Y. 11940

[21] Appl. No.: 168,393

[22] Filed: Dec. 17, 1993

Related U.S. Application Data

[63] Continuation of Ser. No. 771,302, Oct. 2, 1991, abandoned, Continuation-in-part of Ser. No. 505,053, Apr. 5, 1990, abandoned.

[51] Int. Cl.⁶ .................. B29C 45/14; B32B 35/00
[52] U.S. Cl. .................................. 425/12; 156/94; 156/98; 264/36; 425/13; 427/140
[58] Field of Search ........................... 425/11–13; 264/36; 156/94, 98; 427/140

[56] References Cited

U.S. PATENT DOCUMENTS

| | | | |
|---|---|---|---|
| 3,109,765 | 10/1963 | Petrowsky | 161/39 |
| 3,138,505 | 6/1964 | Hirsch | 156/94 |
| 3,388,016 | 6/1968 | Murray et al. | 156/94 |
| 3,772,114 | 11/1973 | Kowalchuk | 156/98 |
| 3,841,932 | 10/1974 | Florler et al. | 156/94 |
| 3,887,413 | 6/1975 | Speer | 156/94 |
| 3,914,145 | 10/1975 | Forler et al. | 156/98 |
| 4,132,516 | 1/1979 | Story | 425/13 |
| 4,200,478 | 4/1980 | Jacino et al. | 156/94 |
| 4,385,879 | 5/1983 | Wilkinson | 425/13 |
| 4,473,419 | 9/1984 | Hardy | 156/94 |
| 4,497,755 | 2/1985 | Korsyn | 264/1.7 |
| 4,597,727 | 7/1986 | Birkhauser, III | 425/13 |
| 4,851,169 | 7/1989 | Lay et al. | 264/36 |
| 4,917,745 | 4/1990 | Speer | 156/94 |
| 4,961,883 | 10/1990 | Jacino et al. | 264/36 |

*Primary Examiner*—Khanh Nguyen
*Attorney, Agent, or Firm*—Auslander & Thomas

[57] ABSTRACT

A kit and method for the repair of broken plastic light bulb housings for automobiles is provided to repair through the plastic. The kit and method enables a repair to include a bead overriding the surface of the repair. The bead extends beyond the periphery of the break obscures the outline of the break and strengthens the repair. A simple mold is provided or formed from a selected gasket and cover provided.

14 Claims, 3 Drawing Sheets

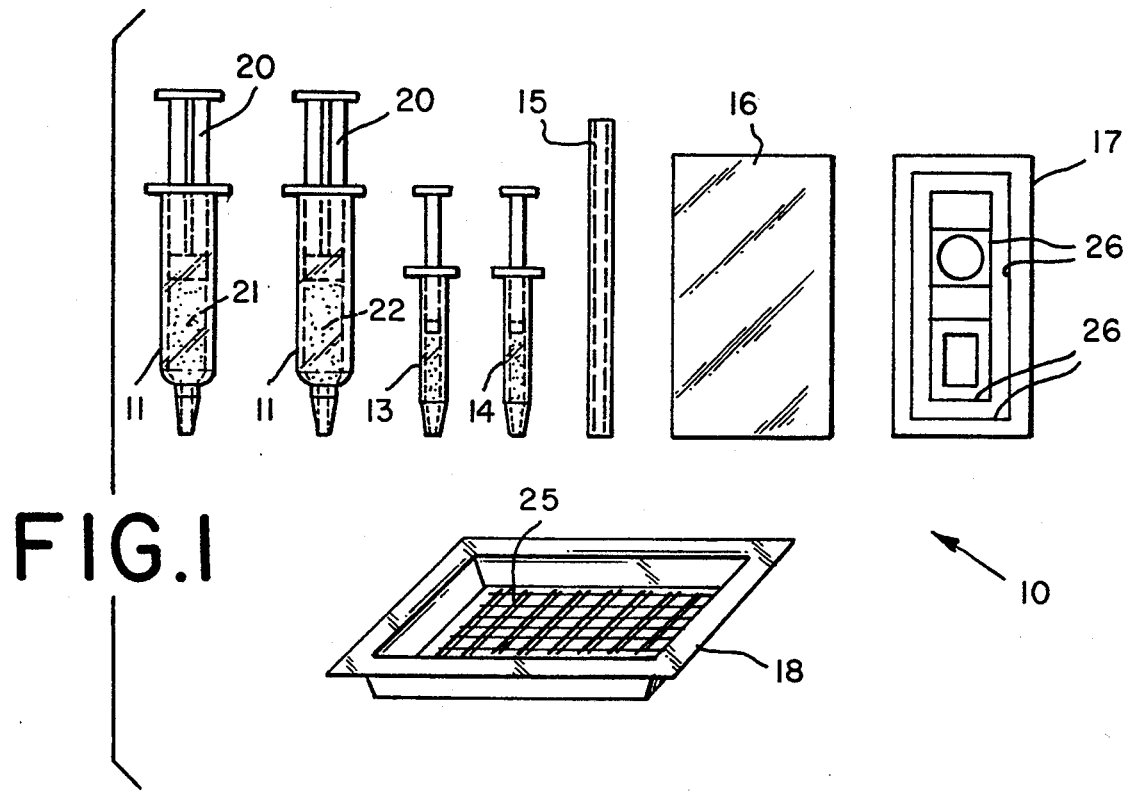
FIG.1
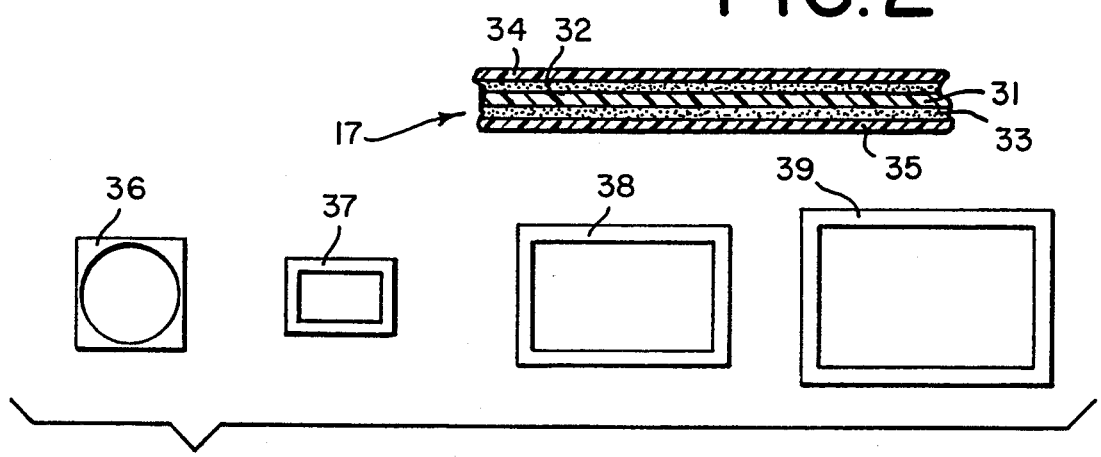
FIG.2
FIG.3
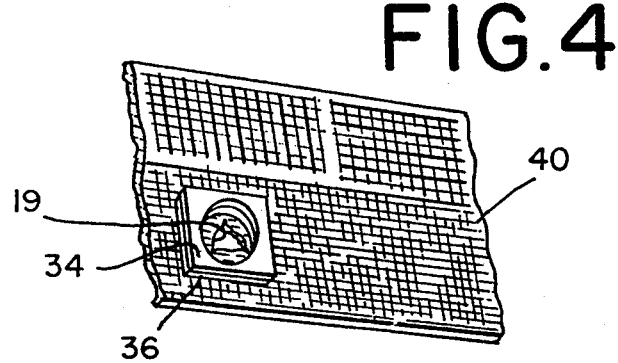
FIG.4

PLASTIC AUTOMOBILE BULB HOUSING REPAIR KIT

BACKGROUND OF THE INVENTION

The present invention is a continuation of application Ser. No. 07/771,302, filed Oct. 2, 1991, now abandoned which is a continuation in part of application Ser. No. 505,053, filed Apr. 5, 1990, now abandoned.

The present invention relates to an automobile plastic light bulb housing repair kit and method.

Automobile light bulbs are oftentimes engaged in complex, expensive, enclosed molded plastic housings. The automobile plastic bulb housing holds the light bulb, serves as a reflector, light diffuser and protects the bulb and reflector from the atmosphere.

A break must be repaired or the entire automobile plastic light bulb housing must be replaced. Replacement is surprisingly expensive. Good repair of a cracked or broken diffuser has been difficult or impossible. Breaks may be difficult to access, parts of the plastic may be missing, the broken area may be colored, and it may be difficult to restore the diffusive characteristics of the repaired area.

The repair of automobile plastic light bulb housings has many similarities to the repair of glass, particularly the repair of breaks through glass.

The repair of automobile plastic light bulb housings also has similarities to the normal repair of plastic or repairs where plastics are used to repair voids.

Usually repairs are made by the flush filling of the broken spaces.

DESCRIPTION OF THE RELATED ART

In the past, automobile plastic light bulb housings have been repaired by covering with tape just to protect them from the atmosphere. The tape has been opaque or translucent. Tapes used in such repair have even seen selected to match the color of the broken part of the automobile plastic light bulb housing.

U.S. Pat. No. 4,497,755 discloses a kit for the repair of automobile plastic light bulb housings. The repair method includes the use of flush tapes to form a releaseable form for molding an exothermic adhesive resin to make a repair. Colored resin was used to match colors in the automobile plastic light bulb housing and glass bead were used to simulate the facets in the broken diffuser area. The flush repair fills in the broken parts without any reenforcement of the casting.

As shown in Ser. No. 899,011, U.S. Pat. No. 5,209,935 which is incorporated herein by reference, breaks through glass have been repaired by providing a gasket with a cover to form a mold for a casting including a peripheral rim surrounding a repaired area. The gasket and cover define the shape of the repair casting.

The disclosure of U.S. Pat. No. 4,280,478 discloses a pedestal. The pedestal is also usable for the repair of plate glass. The particular pedestal is different from structures in the prior art as applied to the art of glass repair. The pedestal is distinguished by a flange and a seal, adapted to override and surround a break in glass. The pedestal is significant in its mountability, simplicity and economy and is distinguished from other structures disclosed in the prior art with regard to glass repair, with the exception of the pedestal disclosed in U.S. Pat. No. 4,132,516. The pedestal in U.S. Pat. No. 4,132,516 has many similarities to the pedestal of the U.S. Pat. No. 4,280,478 patent and mold of the present invention.

The gasket in U.S. Pat. No. 5,209,935 is somewhat similar to the seal as used in U.S. Pat. No. 4,200,478 which interacts with a reservoir for resin in the repair of glass, usually safety glass. The seal also is usable to repair a break through the glass by providing a flush casting as shown in FIG. 6. Actually the repair includes a light distorting protruding bead which is meant to be removed to leave a flush surface.

A spectrum of various means have been provided to repair plastic surfaces, some of which bear similarities to the repair of breaks through glass.

U.S. Pat. No. 3,887,413 discloses a method for repairing plastic materials, using an insert backing material, protective paste and graining paper and uses a hot surface, such as iron. See FIG. 1. A flat backing material is used to hold the heat responsive elastic repair material flush with the surface of the patched area.

U.S. Pat. No. 3,772,114 discloses a process for mending fabrics, including the use of adhesive which contains a color additive to match the area around the repair. The invention is involved with fitting in a flush patch supported on one side.

U.S. Pat. No. 3,388,016 discloses a method and apparatus for patching articles. A syringe is used as shown in FIGS. 8 and 9. The method and apparatus are a complex set to apply a fiber glass patch to one surface. Flush liners may be used.

U.S. Pat. No. 3,109,765 discloses a method for repairing surfaces, wherein a textured backing is used. A textured backing hold holds a composition applied from an outer surface of a rupture.

U.S. Pat. No. 4,961,883 discloses a pedestal and a seal surrounding an opening and forming a chamber for the introduction of a repair plastic and a regular bead, which is to be cut off flush, is formed in the central opening 20.

U.S. Pat. No. 4,473,419 discloses the use of a flush patch to a contoured surface for the purpose of making a repair.

U.S. Pat. No. 3,138,505 discloses means for mending fabric, using a heat responsive thermoplastic adhesive backed by a substrate which may be stripped, then bonding a matching patch to the fabric and the adhesive. The patch is ironed on.

U.S. Pat. No. 3,841,932 discloses a surface patch for windshield glass, which leaves a superficial dam which is removed.

U.S. Pat. No. 3,914,145 discloses a flush patching situation for plate glass.

SUMMARY OF THE INVENTION

According to the present invention, a kit is provided for the repair of automobile plastic light bulb housings. The kit includes a resin and a hardener in dispensers such as syringes, dispensers for coloring the resin to match a colored area to be repaired, an extension tube for positioning the resin, a gasket template, a gasket cover and a light diffuser.

The kit enables a simple mold to be placed surrounding a break in an automobile plastic light bulb housing. A gasket is selected from the template and is adhesively adherable, overriding and surrounding the outside of the break in the automobile plastic light bulb housing. The gasket template is provided with adhesive layers on both sides protected by a releasable paper, sheet or covering.

A gasket is selected from the template. The template is selected to be large enough to extend beyond the boundaries of the break. The gasket has its release paper removed from one side and is adhered surrounding the break. The outer release paper is then removed. The gasket cover is preferably a MYLAR ® sheet. The cover is usually cut out to match the gasket, and then adhered to the gasket, forming a sealed mold around the break that includes a flat peripheral rim over the outer surface of the automobile plastic light bulb housing.

The effect of the present invention is to present a selection of molds for use in the repair of a plastic light bulb housing.

The caps are removed from the epoxy and resin hardener syringes and the resin and hardener are emptied into the textured blister cup forming part of the package at one side. Where the repair area is colored, a pigment in a syringe is selected from the kit and mixed in the adhesive mixture. A plunger from the Figment syringe may be used to mix the mixture in the blister cup.

The resin may be a hardenable epoxy or even a light curable adhesive. The resin must have an index of refraction, when cured, substantially the same as the plastic light bulb housing.

A tube in the kit may be attached to the large syringe, if it still has a plunger in it, so that the adhesive mixture may be taken into the syringe. The lens to be repaired is then laid flat. The syringe is introduced through the bulb opening. The adhesive mixture may be colored and can be used to fill the damaged area even where broken pieces are missing. Adhesive is then applied to fill the gasket and the damaged area. Holding the plastic light bulb housing over a light, may help to view the filling of the break as the adhesive is being introduced, to see that the adhesive is evenly spread. Air bubbles trapped in the adhesive in the repair area may be removed by tapping the cover over the gasket from the outside. This will also help the resin flow better and form in the gasket.

The blister cup will then be cleaned and a clear part of it cut to a matching pattern the size of a repair. The cut pattern is then introduced inside the lens and with a pencil, or other object, guided to cover the repaired area. The blister then serves to create the effect of a reflector over the otherwise smooth repair area. The repair is completed after the adhesive has had an opportunity to set. Usually, after about two hours, the gasket may then be removed.

The kit of the present invention is for the repair of a break in a plastic light bulb housing. The kit has a mold for hardenable adhesive resin. There are means so that the resin can be dispensed into a mixing receptacle and taken up and dispensed into a break from within a plastic light bulb housing. The mold has a basic substrate layer and an adhesive layer on the substrate layer.

The mold may have a releasable sheet on the adhesive layer and may be transparent. The mold may be made, including a gasket, which may have a substrate layer and adhesive layers on each side and releasable sheets. A scored sheet may have several gaskets. The gasket requires a cover which may be transparent.

The adhesive resin may require a hardener. A syringe may be used for adhesive takeup and dispensing and the resin and hardener may each be carried in a separate syringe. There may be included more than one pigment and a pigment dispenser which may be a syringe.

A mixing receptacle also may be a light diffuser with ripples.

The plastic light bulb housing may be for an automobile.

There may be an extension tube attachable to the syringe.

A method repairs a break in a plastic light bulb housing providing a mold having a substrate layer and an adhesive layer. The mold is of a size greater than the perimeter of said break. The mold is adhered outside of the housing over said break. A hardenable adhesive resin is then filled into the break from inside the housing and hardened. The mold is removed leaving a bead over the housing beyond the periphery of the break.

The mold may include a releasable sheet on the adhesive layer which is removed before adhering the mold over the break. The mold may be transparent.

The mold may be in the form of a gasket with a substrate layer and adhesive layers on each side of the substrate layer, which may have a releasable sheet on the adhesive layers which has to be removed from the gasket before it is adhered over the break. The gasket may be selected from a scored sheet and requires a cover to be adhered to the gasket. The cover may be transparent.

The hardenable adhesive resin may have a separate hardener and be taken up and dispensed in a syringe.

The resin and hardener may be dispensed into a mixing receptacle and pigment intermixed from a dispenser.

The resin mix is taken up in a syringe before filling the break, an extension may be engaged on the syringe to facilitate the take up and dispensing.

A light diffuser may be cut to a size to cover the perimeter of the break and be inserted into the housing and positioned over the break before the hardening of the adhesive resin.

The mixture in the break should be deaerated before it hardens.

The kit is provided for the repair of a break in a plastic light bulb housing. The repair is effected on the housing when the housing is in a substantially horizontal position. The repair provides a peripheral rim beyond the break on the outer surface of the housing, the kit comprising a mold affixable to the outside of the plastic light bulb housing extending beyond the periphery of the break. The mold has a back wall and a depending peripheral wall. There is a hardenable adhesive resin to be cast in the mold. Adhesive is taken up and dispensed for mixing and dispensing the hardenable resin before it is molded to form a casting. The mold, when affixed to the plastic light bulb housing, includes at least a substrate layer and an adhesive layer on the substrate layer.

BRIEF DESCRIPTION OF THE DRAWING

Although such novel feature or features believed to be characteristic of the invention are pointed out in the claims, the invention and the manner in which it may be carried out may be further understood by reference to the description following and the accompanying drawings.

FIG. 1 is a plan view of the elements of the plastic light bulb housing repair kit of the present invention.

FIG. 2 is a cut away side elevation of the gasket sheet.

FIG. 3 is a plan view of the individual separated gaskets.

FIG. 4 is a cut away view of a gasket placed over a break in a plastic light bulb housing.

DESCRIPTION OF THE FIGURES

Figure 5:
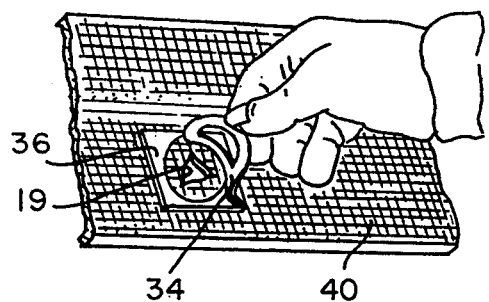
FIG. 5 is a view of FIG. 4 showing the removal of the outer release paper from the gasket of FIG. 4.

Referring now to the figures in greater detail, where like reference numbers denote like parts in the various figures.

The plastic bulb housing repair kit 10 comprises syringes 11, one of which includes an adhesive resin 21, the other of which includes a hardener 22. There are two pigment dispensers 13 and 14, an extension tube 15, a sheet of clear film 16, a gasket sheet 17 and a blister cup 18. The plastic bulb housing repair kit 10 generally comes on a blister pack (not shown) which includes the blister cup 18.

The blister cup 18 preferably includes dimples or ripples, to form a light diffuser, as will be hereinafter shown. As shown in FIG. 2, the gasket sheet 17 is in multilayers having a central, flexible plastic gasket layer 31, both sides of which have adhesive layers 32, 33. The adhesive layers are preferably protected with release papers 34 and 35. As can be seen in FIG. 1, the gasket sheet 17 includes through scores 26. These through scores 26 define separable gaskets 36, 37, 38 and 39 selectable from the gasket sheet 17 as shown in FIG. 3.

Figure 6:
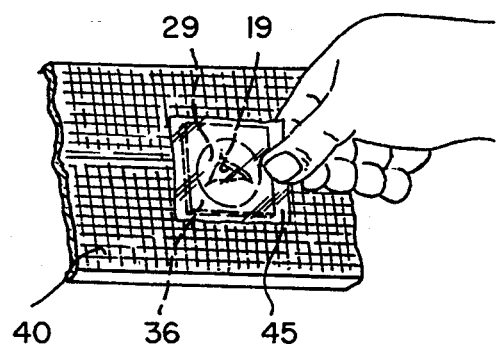
FIG. 6 is a detail of FIG. 5 showing the placement of a cut to size clear film cover for the gasket.
Figure 7:
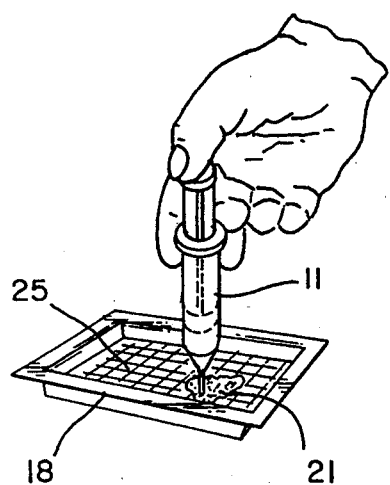
FIG. 7 shows the placing of an adhesive component in the kit package blister cup.
Figure 8:
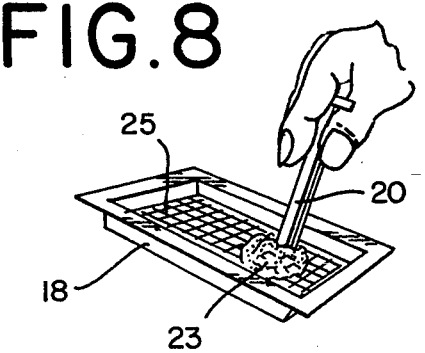
FIG. 8 is another view of FIG. 7, mixing the adhesive components with the removed stem of one of the syringes.
Figure 9:
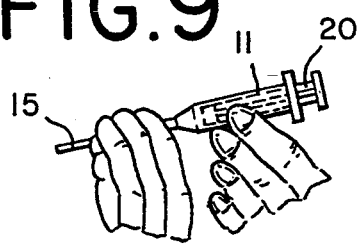
FIG. 9 shows the placement of the extension tube on an empty adhesive component syringes.
Figure 10:
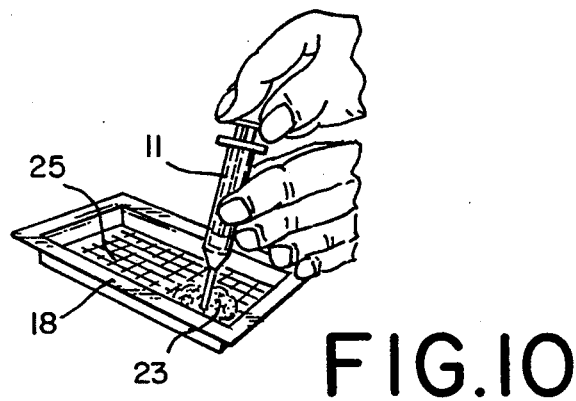
FIG. 10 shows intake into the syringe of FIG. 9 of the mixed adhesive.
Figure 11:
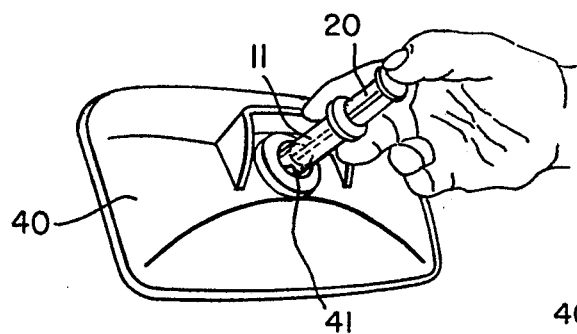
FIG. 11 shows a rear view of the plastic light bulb housing of FIG. 4 with the syringe of FIG. 10 inserted for the placement of the adhesive mixture into the break and the cavity formed by the covered gasket.

In FIGS. 4, 5 and 6, a plastic bulb housing 40 is shown with a break 19. A selected gasket 36 with its release paper 35 removed, is affixed, surrounding the break 19. As shown, the release paper 34 is still attached to the gasket 36. The release paper 34 is removed and a matching, selectively cut film 45, cut from the clear film sheet 16, is placed over the gasket 36, forming a thin chamber 29 surrounding the break 19 and an unbroken area beyond the break 19.

As shown in FIGS. 7 through 10, the hardenable resin 21 is discharged into one end of the blister cup 18. The hardener 22 is thereafter discharged into the resin 21, Where appropriate, pigment from either the first or second pigment dispenser 13, 14 in introduced into the adhesive mixture 23. Using the stem 20 of an empty syringes 11, the mixture of resin 21 hardener 22 and any of the selected pigments is formed into the adhesive mixture 23. An empty syringe 11 is then provided with the extension tube 15 and the mixture 23 is drawn into the syringe 11.

As shown in FIGS. 11 through 16, the syringe 11 is extended into the plastic bulb housing 40 through the bulb opening 41. The adhesive mixture 23 is discharged into the break 19 area to fill the break 19 and have the hardenable mixture 23 pass through the break 19 and fill the entire chamber 29 formed by the gasket 36 and the cut film 45 forming a bead 28 in the form of a peripheral rim.

Once the mixture 23 satisfactorily fills the break 19 and chamber 29, it is advisable to manipulate the cut film 45, such as by tapping from the outside, so as to allow any air bubbles 24 to escape from the adhesive mixture 23.

A section of the diffuser 25 of the blister cup 18 is then selectively cut, forming a diffuser 46, large enough to cover the entire repair area above the repair in the break 19. The diffuser 46 may then be manipulated with a tool 27 such as a pencil to be properly positioned over the repair area. Once the adhesive mixture 23 has hardened, the gasket 36 with its adhered cut film 45, is peeled from the plastic bulb housing 40. The repair of the break 19 includes a surrounding by a bead 28.

OPERATION

In use, a proper sized gasket 36 through 29 is selected so that the entire area of a break, plus a reasonable periphery, may be thoroughly covered. Then the release paper 35 is removed and the gasket 36–39 firmly pressed into liquid tight engagement around the periphery of the break 19 on the smooth outer surface of the plastic bulb housing 40. A piece of the clear film sheet 16 is then cut out, matching the selected gasket 36–39. The cut film 45 is applied over gasket 36–39. It would be impracticable to score the clear film sheet 16, since it is essential that it present a clear, unbroken surface above and around the break 19. Less material is used providing one clear film sheet 16 that a selection of cut gasket covers.

The gasket 36–39 with the cut film 45 over the break 19, is selected to form a thin chamber 29 beyond the periphery of the break 19. This thin chamber 29 reassures that the entire area of the break 19 will be covered and repaired. The configuration of the chamber 29 formed by the gasket 36–39 and the cut film 45 forms a smooth bead 28, of greater circumference than the break 19. The nature of the bead 28 provides strength to the repair and avoids a visible outline of the break 19 on the surface of the plastic light bulb housing 40.

The pigments in the pigment dispensers 13, 14 are generally red and amber. Thus, insofar as repair is concerned, the usual plastic light bulb housing 40 will usually either be red, amber or clear. Where the break is in a colored area, the pigment is selected so to match the color of the broken area. The pigment is dispensed into the blister cup 18 adhesive mixture 23 of resin 21 and hardener 22, generally with a stem 20 from one of the syringes 11. The pigment is mixed so as to be uniformly distributed.

Figure 12:
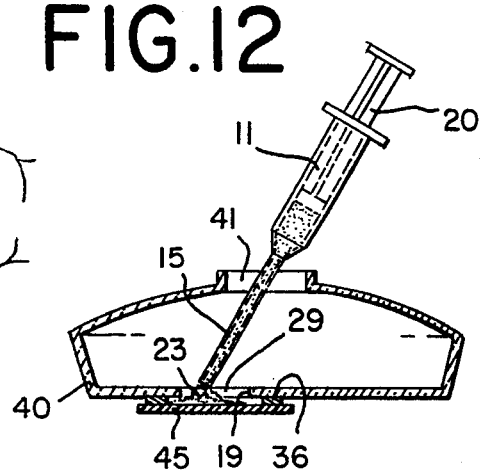
FIG. 12 is a sectional elevation through the plastic light bulb housing of FIG. 11.
Figure 13:
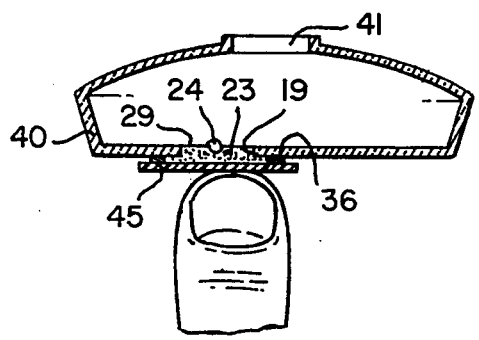
FIG. 13 is a section view of FIG. 12 showing the adhesive mixture being tapped to help the removal of air bubbles.
Figure 14:
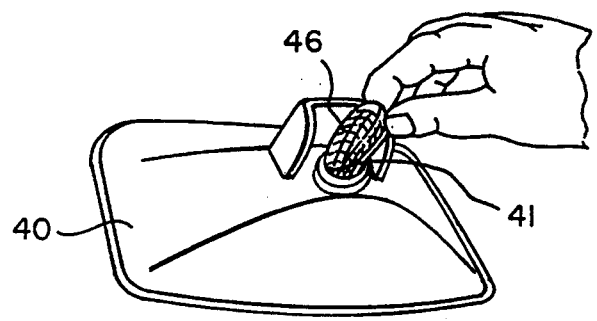
FIG. 14 shows the plastic light bulb housing of FIG. 13 with a cut portion of the blister cup being introduced through the bulb opening as a diffuser.
Figure 15:
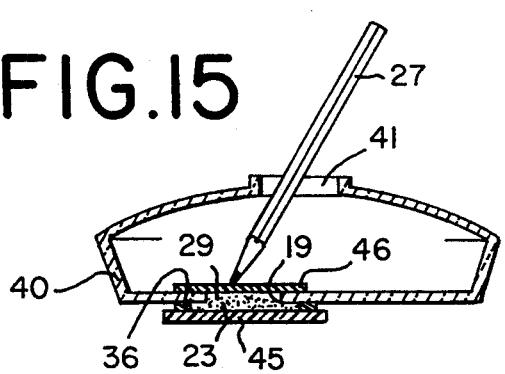
FIG. 15 is a section of FIG. 14 showing the manipulation of the cut blister cup portion over the repaired area of the break.
Figure 16:
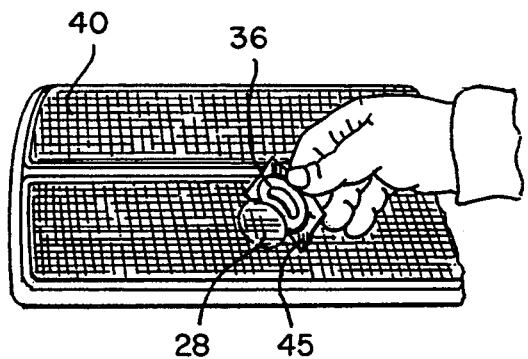
FIGS. 16 is a front plan view of the bulb housing of FIG. 15 showing the removal of the gasket after the repair has been completed.

Once the adhesive mixture 23 is filled into the break, as shown in FIG. 12, it should be thoroughly filled in so that the entire beak 19 area is covered and all of the mixture 23 thoroughly fills the chamber 29 formed by the gasket 36–39 and the overlying cut film 45 to form the bead 28.

As can be seen in FIG. 12, a chamber 29 is formed by the break 19, the gasket 26 and the cut film 45. When the plastic bulb housing 40 is in horizontal position, the adhesive mixture is introduced and flows through the chamber 29 by gravity to fill the chamber 29, including the bead 28. Gravity also levels the adhesive mixture 23 in the plastic bulb housing 40, once the chamber 29 is filled.

Manipulating the cut film 45 by tapping or other means, removes all air bubbles 24 from the unhardened mixture 23, removing optical impediments based upon the air bubbles 24 in the repair.

With the placement of the cut diffuser 46, pushed into position by the tool 27, the back portion of the repair has optical characteristics, substantially the same as the unbroken plastic light bulb housing 40 once the repair is complete.

The adhesive mixture 23 forms a casting with the bead 28 in the form of a peripheral rim over the outer plastic of the light bulb housing 40, as a cap, sealing the casting in the plastic housing bulb housing 40, against being dislodged.

For an effective repair the adhesive mixture 23 should be placed into the chamber 29, formed by the gasket 17 and the clear film sheet 16, while the plastic light bulb housing 40 is in a substantially horizontal position.

The terms and expressions which are employed are used as terms of description; it is recognized, though that various modifications are possible.

It is also understood the following claims are intended to cover all of the generic and specific features of the invention herein described; and all statements of the scope of the invention which as a matter of language, might fall therebetween.

Having described certain forms of the inventions in some detail, what is claimed is:

1. A kit for a gravity system repair of a break through a plastic light bulb housing when said repair is effected on said housing when said housing is in a substantially horizontal position and providing a peripheral rim beyond said break on the outer surface of said housing, said kit comprising in combination, a scored sheet including a plurality of gasket cut outs, a mold, said mold thin and extending beyond the periphery of said break; including a flat back wall without openings therethrough; a peripheral wall depending therefrom; and a gasket, said gasket selectable from said scored sheet, said gasket including a first substrate and a first adhesive layer on said first substrate; and a second substrate and a second adhesive on said second substrate, said first adhesive layer for sealing and engaging and to removably affix said gasket to the outside of said light bulb housing, said second adhesive layer for sealing and engaging said gasket to said back wall, a releasable sheet on each said adhesive layer, said depending peripheral wall defined by said gasket, flowable hardenable adhesive resin means to be cast in said mold for filling said break in said plastic light bulb housing, mixing receptacle means, said mixing receptacle means for mixing said flowable hardenable adhesive resin means, flowable hardenable adhesive resin means takeup and dispensing means, and said flowable hardenable adhesive resin means takeup and dispensing means for taking up said flowable hardenable adhesive resin means and dispensing said flowable hardenable adhesive resin means into said mold from inside said housing through said break to form a casting.

2. The invention of claim 1 wherein said mold includes at least a releasable sheet on said adhesive layer.

3. The invention of claim 1 wherein said mold is transparent.

4. The invention of claim 1 wherein said back wall is formed by a plastic sheet.

5. The invention of claim 4 wherein said back wall is transparent.

6. The invention of claim 1 wherein said hardenable adhesive resin means is a multipart resin including a resin part and a separate hardener part, said parts when mixed form a hardened resin when cured.

7. The invention of claim 1 wherein said adhesive takeup and dispensing means includes at least one syringe.

8. The invention of claim 6 wherein said flowable hardenable adhesive resin means and said hardener are each contained in a separate syringe.

9. The invention of claim 1 including at least one pigment, and including means to dispense said pigment, said at least one pigment selectable to pigment said flowable hardenable adhesive resin means to match the color of said plastic light bulb housing at the point of said break.

10. The invention of claim 9 wherein said pigment dispensing means is a syringe.

11. The invention of claim 7 wherein said adhesive takeup and dispensing means includes an extension tube attachable to said at least one said syringe.

12. A kit for a gravity system repair of a break through a plastic light bulb housing when said repair is effected on said housing when said housing is in a substantially horizontal position and providing a peripheral rim beyond said break on the outer surface of said housing, said kit comprising in combination, a mold, said mold thin and extending beyond the periphery of said break; including a flat back wall without openings therethrough; a peripheral wall depending therefrom; and a gasket, said gasket including a first substrate and a first adhesive layer on said first substrate; said first adhesive layer for sealing and engaging and to removably affix said gasket to the outside of said light bulb housing, said depending peripheral wall defined by said gasket, flowable hardenable adhesive resin means to be cast in said mold for filling said break in said plastic light bulb housing, mixing receptacle means, said mixing receptacle means for mixing said flowable hardenable adhesive resin means, said mixing receptacle means including light diffuser means, said light diffuser means being an integral part of said mixing receptacle means and separatable therefrom for introduction into said plastic light bulb housing at the point of said repair for diffusing light passing through said break, flowable hardenable adhesive resin means takeup and dispensing means, and said flowable hardenable adhesive resin means takeup and dispensing means for taking up said flowable hardenable adhesive resin means and dispensing said flowable hardenable adhesive resin means into said mold from inside said housing through said break to form a casting.

13. The invention of claim 12 wherein said adhesive takeup and dispensing means includes at least one syringe.

14. The invention of claim 12 wherein said diffuser means includes a rippled surface configuration.

* * * * *